Jan. 3, 1967   C. R. WILHELMSEN   3,296,609
CHARACTER DISPLAY APPARATUS
Filed Nov. 12, 1963   8 Sheets-Sheet 1

United States Patent Office 3,296,609
Patented Jan. 3, 1967

3,296,609
CHARACTER DISPLAY APPARATUS
Carl R. Wilhelmsen, Huntington Station, N.Y., assignor to Hazeltine Research Inc., a corporation of Illinois
Filed Nov. 12, 1963, Ser. No. 322,765
8 Claims. (Cl. 340—324)

This invention relates to character display apparatus. Such apparatus is capable of receiving an electrical signal in some coded form and representative of some character and providing a visual indication of that character as it would normally be written or read.

Generally, apparatus of this nature includes a computer or other similar device which supplies electrical information in binary or otherwise coded form and an indicating device on which the particular information supplied by the computer is viewed. In addition, such apparatus includes circuits such as matrices which respond to the electrical information signals to control the indicating device in a particular manner to energize it at selected times and at selected locations so as to view the particular information. The primary shortcoming of many presently known character displays is that this last-mentioned circuitry which controls the indicating device is composed of expensive components such as diodes.

It is an object of the present invention to provide new and improved character display apparatus which employs inexpensive components such as resistors in the circuitry which controls the indicating device.

In accordance with a particular form of the present invention character display apparatus comprises means for generating signals corresponding to segments of a pattern from which selected segments may form different characters and an indicating device responsive to the generated signals and capable of displaying the pattern. The invention additionally includes means for supplying signals representative of particular characters and means including resistor matrix circuitry responsive to the character representative signals for selecting and enabling those generated signals corresponding to segments of the pattern needed to make up the particular characters to display the particular characters on the indicating device and for rejecting those generated signals corresponding to other segments.

For a better understanding of the present invention together with other and further objects thereof, reference is had to the following description taken in connection with the accompanying drawings, and its scope will be pointed out in the appended claims.

Referring to the drawings:

FIG. 4b shows waveforms of input signals to the integrating portion of the deflection circuit of FIG. 4a;

*Description and operation of the character display apparatus*

Figure 1A:
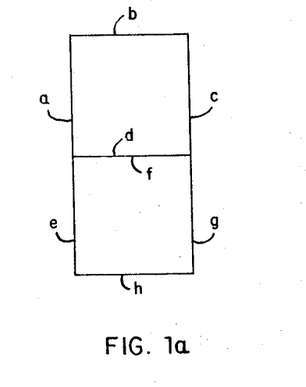
FIG. 1a shows a segmented straight-line figure eight pattern.

The character display apparatus constructed in accordance with the present invention operates basically by developing each character from a segmented pattern. Referring to FIG. 1a, there is shown a straight-line figure eight pattern. All the numerals 0–9, inclusive, and a great number of symbols and letters of the alphabet may be developed by appropriate selection of certain segments of the figure eight pattern and rejection of others. For example, the numeral 4 may be developed by selecting the segments designated "a," "d," "c" and "g" and rejecting the segments designated "b," "e" and "h."

Figure 2:
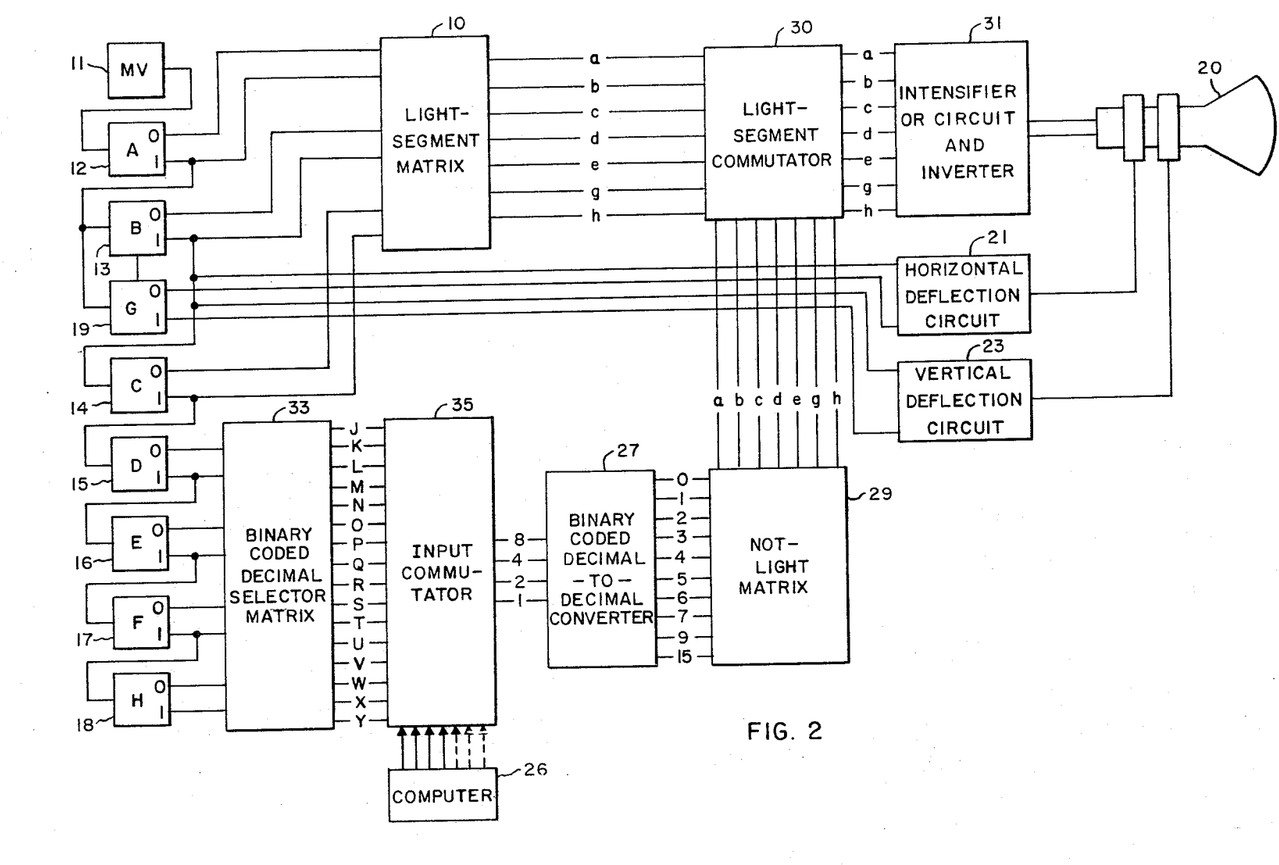
FIG. 2 is a circuit diagram of the character display apparatus constructed in accordance with the present invention.

FIG. 2 is a circuit diagram of the character display apparatus constructed in accordance with the present invention. This apparatus includes means for generating signals corresponding to segments of a pattern from which selected segments may form different characters. Such means may include the light-segment matrix 10 and flip-flops 12, 13 and 14. Flip-flops 12, 13 and 14 are part of a scaler timing chain which additionally includes flip-flops 15–18, inclusive, along with an astable multivibrator 11. An additional flip-flop 19, having the same frequency as flip-flop 13, is also included in the scaler timing chain. The stages of the scaler timing chain have been designated by the capital letters A–H, inclusive (which should not be confused with the small letters designating the segments of the pattern in FIG. 1a). Outputs at two different levels, represented by "0" and "1" are available at each stage in the chain. In order to simplify the explanation of the invention, "0" will refer to a negative potential and "1" will refer to zero potential.

Figure 3:
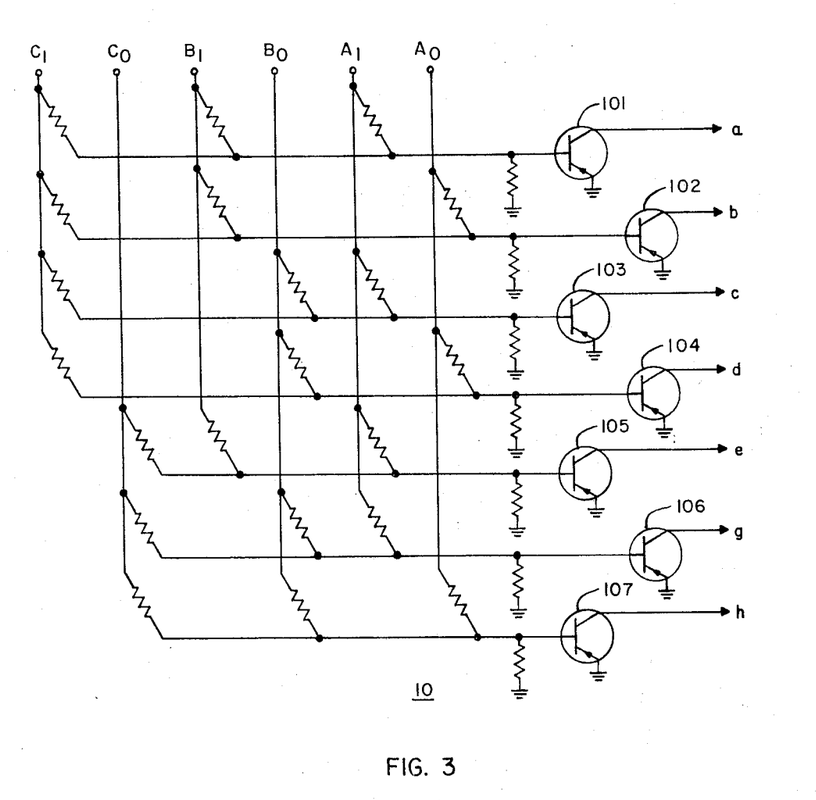
FIG. 3 is a detailed schematic diagram of the light-segment matrix.

The light-segment matrix 10 and the flip-flops 12, 13 and 14 generate signals which appear at the output lines $a$–$h$, inclusive, of the light-segment matrix. Referring to FIG. 3 there is shown a detailed schematic diagram of the light-segment matrix 10. The input terminals designated $A_0$–$C_1$, inclusive, correspond to the output terminals of flip-flops 12, 13 and 14; $A_0$ and $A_1$ being the output terminals of flip-flop 12, $B_0$ and $B_1$ being the output terminals of flip-flop 13 and $C_0$ and $C_1$ being the output terminals of flip-flop 14. These terminals have been given subscripts corresponding to the levels of the potentials at these terminals under initial conditions of the flip-flops. The astable multivibrator 11 serves as a source of clock pulses and as it supplies a series of clock pulses flip-flops 12, 13 and 14 count and change state in the usual manner. This causes sequential changes in the level of the input signals applied to the light-segment matrix 10. Each transistor 101–107, inclusive, in the light-segment matrix 10 along with its associated circuitry operates on NOR type logic. That is, an output signal is produced by the transistor whenever there is a signal on neither one nor any other of the input terminals. Conversely, there is no output if any one or more of the input terminals has a signal present. FIG. 3 fails to show the collectors of each transistor connected to a power source. This deficiency in the drawing will be explained hereinafter in connection with FIG. 6. It will be sufficient to assume that for any transistor shown in FIG. 3, a negative signal applied to its base would prevent the development of an output signal by that transistor. The resistor matrix within the light-segment matrix 10 is so arranged that at any one time only one transistor of the group 101–107, inclusive, has a simultaneous absence of negative signals applied to its base. This transistor therefore produces an output signal. For example, for the initial states of flip-flops 12, 13 and 14, terminals $A_1$, $B_1$ and $C_1$ are at zero potential and terminals $A_0$, $B_0$ and $C_0$ are at a negative potential. Transistor 101 is the only transistor which has a simultaneous absence of negative signals applied to its base and therefore it produces an output signal. For a count of one, when the astable multivibrator 11 supplies its first clock pulse, terminals $B_0$, $B_1$ and $C_0$ and $C_1$ remain at the same potential while terminals $A_0$ and $A_1$ switch due to the change in state of flip-flop 12. Now transistor 102 is the only one that has a simultaneous absence of negative signals applied at its base. In this manner as the counting continues, the light-segment matrix 10, along with the flip-flops 12, 13 and 14, generates signals in a predetermined time sequence which appear at the output lines $a$–$h$, inclusive. The particular time sequence just described is successive. That is, a first signal appears on line "$a$"; a second signal appears on line "$b$" after the signal on line "$a$" has terminated; a third signal appears on line "$c$" after the signal on line "$b$" has terminated, and so on. Each signal thus generated corresponds to a segment of the figure eight pattern shown in FIG. 1$a$. As shown in FIG. 1$a$, one of the horizontal segments has been designated by both the small characters "$d$" and "$f$." The purpose of this designation will become apparent hereinafter but it is mentioned at this time to point out that only one signal is produced at the output of the light-segment matrix 10 corresponding to this segment of the pattern and has been designated by "$d$."

Figure 1B:
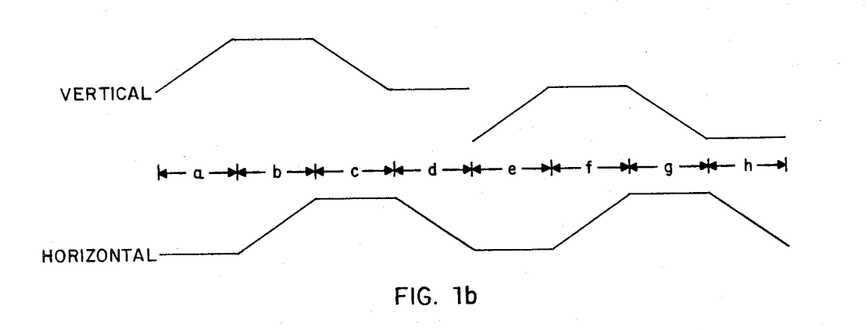
FIG. 1b shows waveforms of deflection signals which may be used to develop the segmented pattern of FIG. 1a on the face of a cathode-ray tube.

The character display apparatus additionally includes an indicating device responsive to the signals produced at the output of the light-segment matrix 10 and which is capable of displaying a segmented pattern. As shown in FIG. 2, the indicating device may be a cathode-ray tube 20. A pair of deflection circuits 21 and 23 develop deflection signals to deflect the cathode-ray beam within the cathode-ray tube 20 to scan the segmented pattern on the face of the tube. In particular, for a figure eight pattern, the horizontal deflection circuit 21 develops a deflection signal such as the one shown in FIG. 1$b$ and the vertical deflection circuit 23 develops a deflection signal such as the one also shown in FIG. 1$b$. Referring to FIGS. 1$a$ and 1$b$, segment "$a$" of the pattern requires no change in the horizontal, while a linear vertical scanning is needed; segment "$b$" requires the vertical scanning to remain constant, while the horizontal scanning must change linearly. In this manner segments "$a$," "$b$," "$c$" and "$d$" are produced by going around the upper square of the pattern in a clockwise direction. At the end of segment "$d$" a negative step is added to the vertical scanning so as to move the cathode-ray beam downward, an amount equal to one segment. Then the same sequence is followed to produce the lower square as was used to produce the upper square.

Each portion of the deflection signals corresponding to a segment of the pattern is synchronized with the signal produced at the output of the light-segment matrix 10 also corresponding to the same segment. This synchronization is accomplished by controlling the development of the horizontal and vertical deflection signals with flip-flops 13 and 19.

Figure 4A:
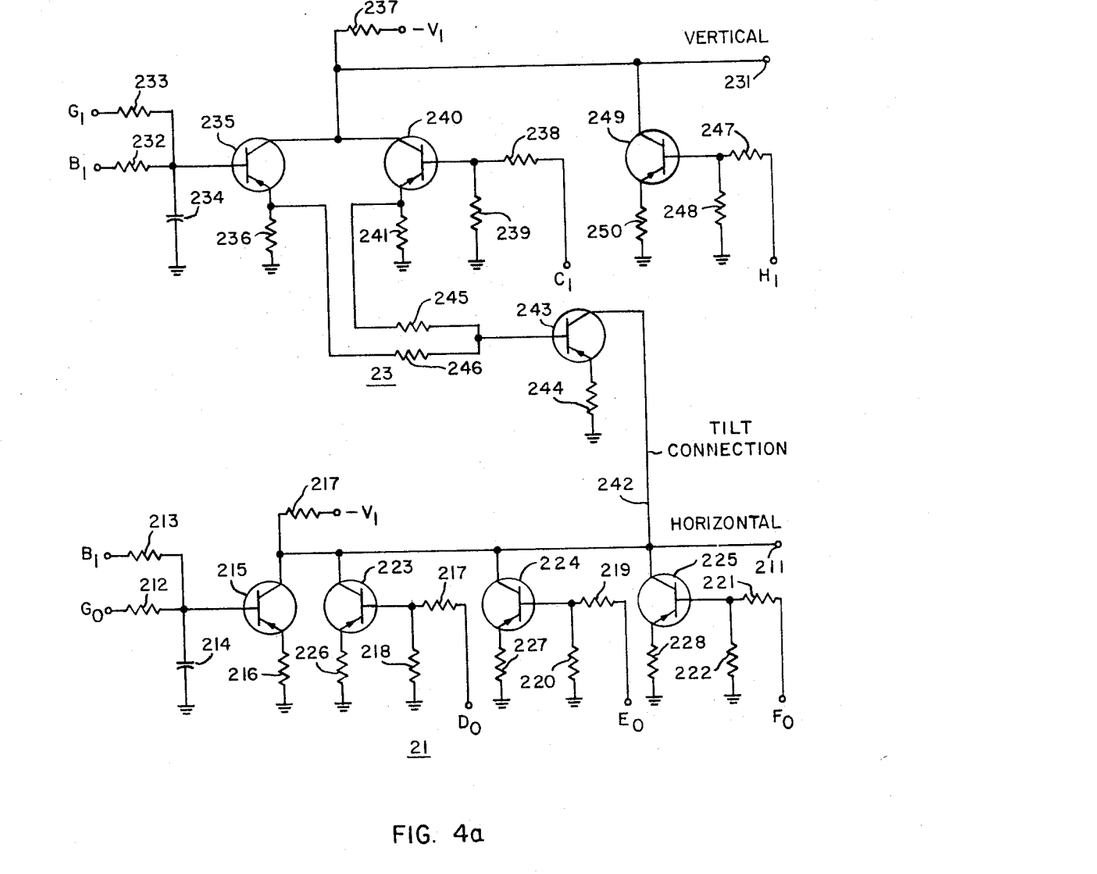
FIG. 4a is a detailed schematic diagram of circuits which may be used to develop the deflection signals shown in FIG. 1b.
Figure 4B:
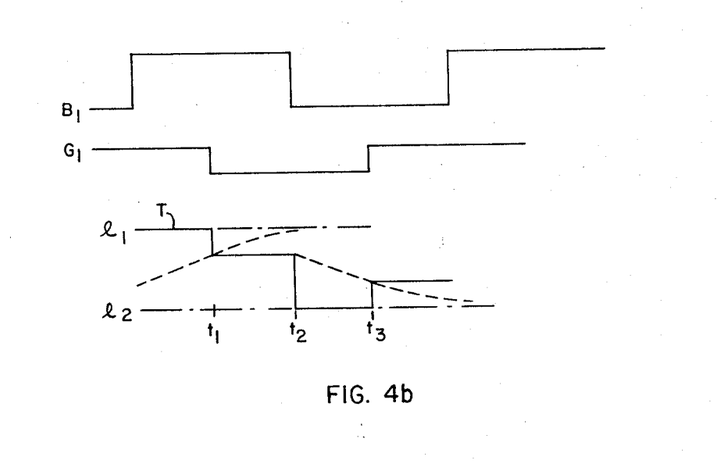

FIG. 4$a$ shows a detailed schematic diagram of circuits which may be used to develop the deflection signals shown in FIG. 1$b$. The upper circuit having an output terminal 231 and designated "VERTICAL" corresponds to the vertical deflection circuit 23 of FIG. 2 and the lower circuit having an output terminal 211 and designated "HORIZONTAL" corresponds to the horizontal deflection circuit 21 of FIG. 2. Referring particularly to the vertical deflection circuit, it may include an integrating circuit which may be composed of a pair of resistors 232 and 233 and a capacitor 234. As shown in FIG. 2, the vertical deflection circuit 23 is jointly connected to output terminal $B_1$ of flip-flop 13 and output terminal $G_1$ of flip-flop 19. Thus, resistor 232 of the integrating circuit in FIG. 4$a$ may be connected to terminal $B_1$ and resistor 233 may be connected to terminal $G_1$. The values of these resistors are so chosen that there is a two-to-one amplitude ratio between the output signals at terminals $B_1$ and $G_1$ at the integrating circuit. FIG. 4$b$ shows portions of the waveforms of both of the signals supplied to the integrating circuit having the proper amplitude ratio. The repetition frequency of the signal supplied from terminal $B_1$ is half the repetition frequency of flip-flop 12 and the astable multivibrator 11. That is, the level of the output signal at terminal $B_1$ changes every second cycle of flip-flop 12. As previously mentioned, the frequency of flip-flop 19 is the same as the frequency of flip-flop 13. The signal at terminal $G_1$, however, leads the signal at terminal $B_1$ by 90°. This phase difference is developed by controlling the phase of flip-flop 19 by flip-flop 13. The combined waveform T of both signals is also shown in FIG. 4$b$. When both signals are supplied to the integrating circuit, capacitor 234 begins to charge in the conventional exponential manner. This charge is indicated by the dotted line and it is seen that the charge approaches a level $l_1$. Assuming the repetition rate or frequency of the signals from terminals $B_1$ and $G_1$ has been preset, the capacitor 234 can be made to charge to the level to which the combined signal drops at time $t_1$ by proper choice of values for the integrating circuit. This presents a condition of zero voltage difference across the parallel combination of resistors 232 and 233 at time $t_1$. Thus, no current flows through the resistors 232 and 233 and the voltage across capacitor 234 is maintained constant as long as the amplitude of the combined signal remains constant at this level. At time $t_2$ the combined signal drops in a negative direction. Capacitor 234 begins to discharge in a conventional exponential manner. This discharge is seen to approach a level $l_2$. At time $t_3$ the amplitude of the combined signal rises to a level equal to the level to which capacitor 234 has discharged. Again there is a condition of zero voltage difference across the parallel combination of resistors 232 and 233 and no current flows through the resistors as long as the amplitude of the combined signal remains constant at this level.

The particular method shown to develop the vertical deflection signal provides a rather linear change for the changing portions of the deflection signal since operation is limited to the linear portion of the exponential charge and discharge. Furthermore, it is seen that each portion of the deflection signal is synchronized with the signals generated at the output of the light-segment matrix 10 which corresponds to the same segment of the pattern since both the generated signals and the deflecion signals are developed from properly timed signals at the outputs of flip-flops 12, 13, 14 and 19. In particular, a signal is produced at the output of the light-segment matrix 10 for each change in state of flip-flop 12. Flip-flop 13 has half the repetition frequency of flip-flop 12, but two portions of the deflection signal are developed during each half-cycle of flip-flop 13. As shown in FIG. 1$b$, both deflection signals have portions, corresponding to segment "$f$." As previously mentioned no signal is generated at the output of the light-segment matrix 10 corresponding to segment "$f$." This is accomplished by simply arranging the resistor matrix within the light-segment matrix in such a way that for the fifth count which corresponds to the time that segment "$f$" is being scanned, none of the transistors 101–107 inclusive within the light-segment matrix have a simultaneous absence of negative signals applied to their base.

An amplifier stage composed of, for example, a transistor 235, an emitter resistor 236 and a collector resistor 237 connected to a source of negative potential follows the integrating circuit to produce a summation of the deflection signals applied to resistors 232 and 233. As indicated in FIG. 4$a$, terminal $C_1$ of flip-flop 14 is connected to the vertical deflection circuit. This connection has been omitted from FIG. 2 for the sake of clarity. Terminal $C_1$ supplies the negative step shown in FIG. 1b required to make the lower square of the figure-eight pattern. This negative step is coupled through resistors 238 and 239 to a transistor 240 having an emitter resistor 241. The collector of transistor 240 is connected to output terminal 231 and to a source of negative potential through resistor 237.

The horizontal deflection signal is developed in essentially the same manner as is the vertical deflection signal except that the outputs at terminals $B_1$ and $G_0$ are supplied to the horizontal deflection circuit and no negative step is developed. Elements in the horizontal deflection circuit corresponding to elements in the vertical deflection circuit have been given corresponding reference numerals in the 210 series.

A lead line 242 designated TILT CONNECTION may be connected between the horizontal and vertical deflection circuits to tilt the pattern so that characters are displayed in their natural way. The tilt signal is supplied through a transistor 243 having an emitter resistor 244 and resistors 246 and 247 to transistors 235 and 240. The remainder of the deflection circuits will be described in detail hereinafter.

Referring again to FIG. 2, the character display apparatus further includes means for supplying signals representative of particular characters. This means may be a computer 26 or other similar device which supplies a binary or otherwise coded signal. As shown in FIG. 2, the computer 26 has a plurality of output terminals. For the particular display apparatus presently being described, the number of output terminals is sixty-four. For the time being, it will be sufficient to assume that the computer 26 only has four output terminals, this number being sufficient to supply a four-bit signal which defines any of the numerals 0–9, inclusive, in binary coded form.

The character display apparatus finally includes means including resistor matrix circuitry responsive to the particular character representative signals supplied by the computer 26 for selecting and enabling those signals generated by the light-segment matrix 10 corresponding to the segments of the pattern needed to make up the particular characters so as to display the particular characters on the cathode-ray tube 20 and for rejecting those generated signals corresponding to other segments. This means may include the binary coded decimal-to-decimal converter 27, the not-light matrix 29, the light-segment commutator 30 and the intensifier OR circuit and inverter 31. Temporarily, it will be assumed that the character representative signals supplied by the computer 26 are supplied directly to the binary coded decimal-to-decimal converter 27 along the input lines indicated 8, 4, 2 and 1, these lines representing the four bits of the binary coded signal.

Figure 5:
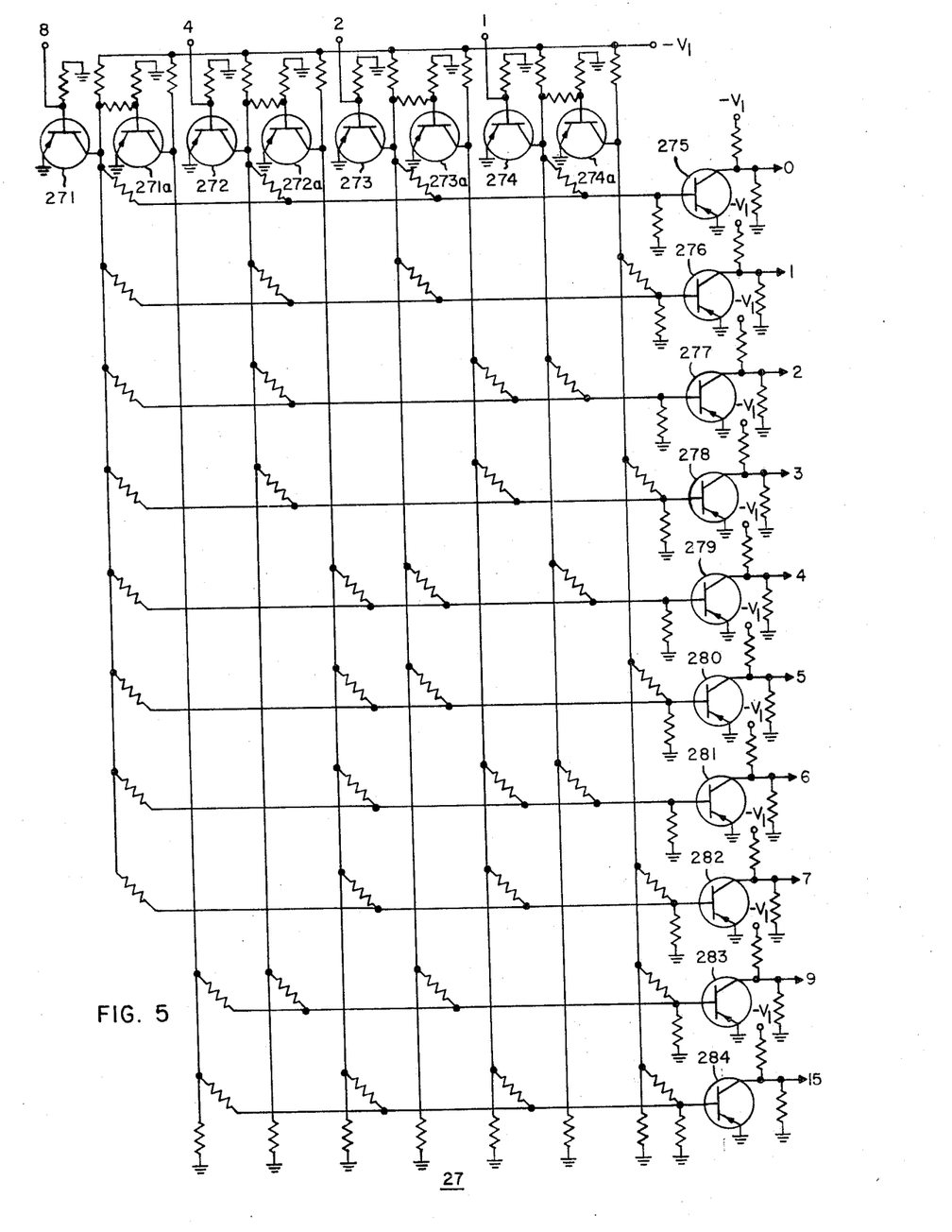
FIG. 5 is a detailed schematic diagram of the binary coded decimal-to-decimal converter.

FIG. 5 is a detailed schematic diagram of the binary coded decimal-to-decimal converter 27. This circuit performs the function of converting the binary coded decimal signals supplied by the computer 26 to regular decimal form. The input terminals designated 8, 4, 2 and 1 correspond to the input lines shown in FIG. 2. The input lines 8, 4, 2 and 1 are respectively connected to transistors 271, 272, 273 and 274. Associated with each of these transistors are inverters 271a, 272a, 273a and 274a. These four pairs of transistors provide two signals at different levels "0" and "1" for each input bit of the input binary signal. Each transistor 275–284, inclusive, in the binary coded decimal-to-decimal converter 27 along with its associated circuitry operates on NOR type logic. The resistor matrix within the binary coded decimal-to-decimal converter 27 is so arranged that at any one time only one transistor of the group 275–284, inclusive, has a simultaneous absence of negative signals applied to its base. This transistor therefore generates an output signal. For example, if the binary coded character repre-sentative input signal corresponds to the numeral 4, an output signal will be developed at the output line 4 of the binary coded decimal-to-decimal converter 27. It is seen in both FIGS. 2 and 5 that no output is provided with a designation 8. This is because the remainder of the apparatus operates in such a manner that in the absence of a signal on any of the output lines of the binary coded decimal-to-decimal converter 27, the numeral 8 will be displayed. This is done merely to add versitility to the character display apparatus so that an additional character, in the form of a dash and arbitrarily designated 15 in FIGS. 2 and 5, may be displayed.

At this time it is worthwhile to point out that the selection and rejection of segments of the pattern performed in the cathode-ray tube 20 may be done in either of two ways: the cathode-ray tube may be normally biased below cutoff so that as the pattern is scanned the signals applied to the input electrodes of the tube render the tube conductive for the duration of particular portions of the scan or the cathode-ray tube may be normally conductive so that as the pattern is scanned, the signals applied to the input eelctrodes render the tube nonconductive for the duration of particular portions of the scan. Since, for most of the characters displayed by the present character display apparatus, more segments are displayed than are suppressed, the matrix circuitry is simpler if the cathode-ray tube 20 is normally conductive and is rendered nonconductive for the duration of those portions of the scan corresponding to segments which do not go to make-up of the particular characters.

Figure 6:
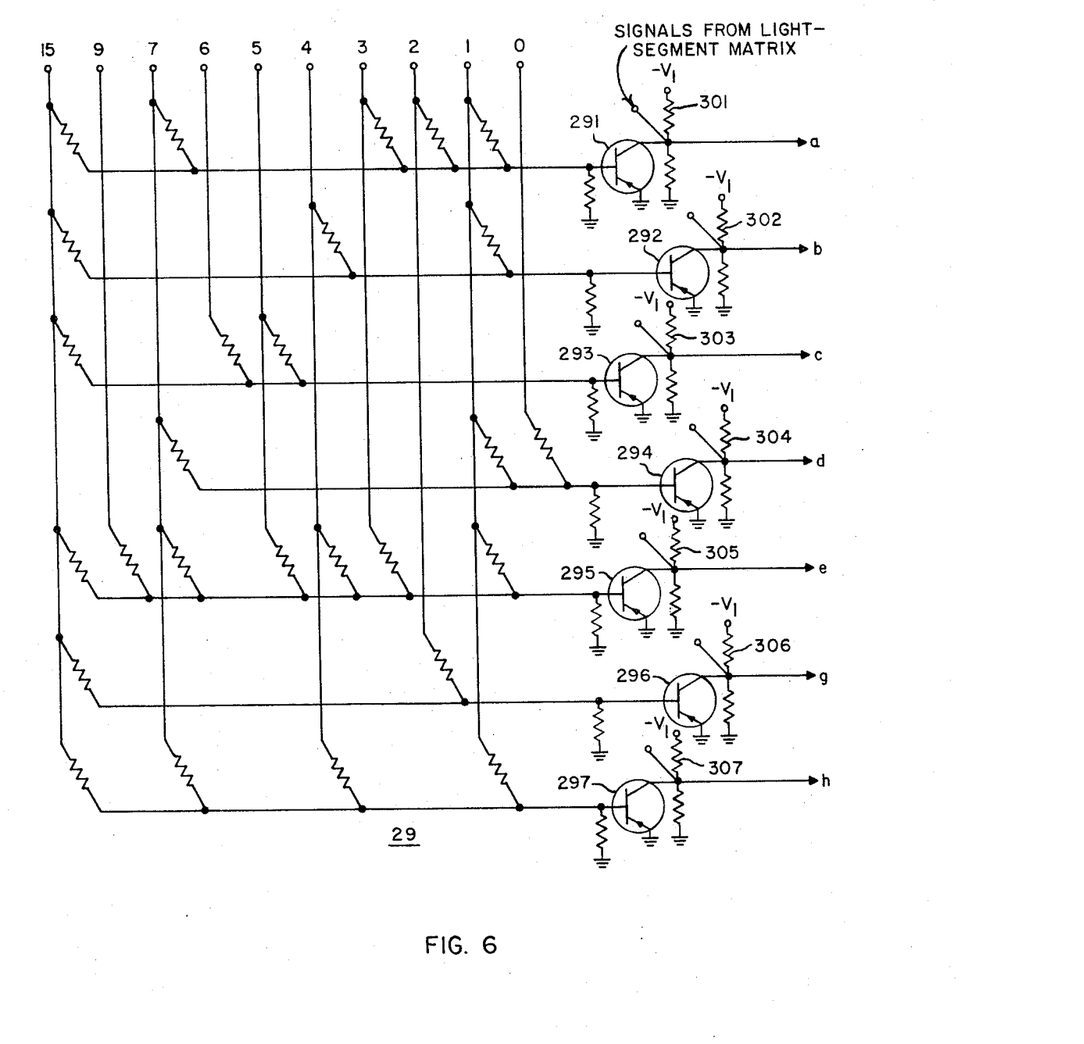
FIG. 6 is a detailed schematic diagram of the not-light matrix.

FIG. 6 is a detailed circuit diagram of the not-light matrix 29. This circuit performs the function of developing suppression signals for suppression of segments which do not go to make-up of the particular characters to be displayed. The input terminals 0–15, inclusive, correspond to the output lines of the binary coded decimal-to-decimal converter 27. Each transistors 291–297, inclusive, corresponds to a segment of the pattern as indicated by the output lines which are designated a–h, inclusive. The resistor matrix within the not-light matrix 29 is so arranged that for a given decimal input signal those transistors corresponding to segments which do not go to make-up of the particular character develop suppression signals. Continuing with the example that the numeral 4 is to be displayed, suppression signals are developed on output lines "b," "e" and "h" of the not-light matrix 29.

The operation of the light-segment commutator 30 of FIG. 2 is performed by collector resistors 301–307, inclusive, in the not-light matrix 29. These resistors connected to a source of negative potential are also the collector resistors for transistors 101–107, inclusive, in the light-segment matrix 10 and were previously mentioned as being absent in FIG. 3. Each resistor is common to that pair of transistors which correspond to the same segment of the pattern. The simultaneous absence of collector current accomplished when there is no coincidence between a signal produced at the output of the light-segment matrix 10 and a suppression signal allows the potential of the parallel collectors to achieve a potential indicating that the particular segment should be displayed. For example, to display the numeral 4, the light-segment matrix 10 will sequentially generate signals corresponding to the segments of the pattern. As the signal corresponding to the segment "a" is produced at output line "a" of the light-segment matrix 10, the segment "a" will be displayed since transistor 291 in the not-light matrix 29 has not generated a suppression signal. As the signal corresponding to the segment "b" is produced at output line "b" of the light-segment matrix 10, the segment "b" will not be displayed since transistor 292 in the not-light matrix 29 has developed a suppression signal. A similar type analysis for the remaining segments will show that the segments which make up the numeral 4 will be displayed.

Figure 7:
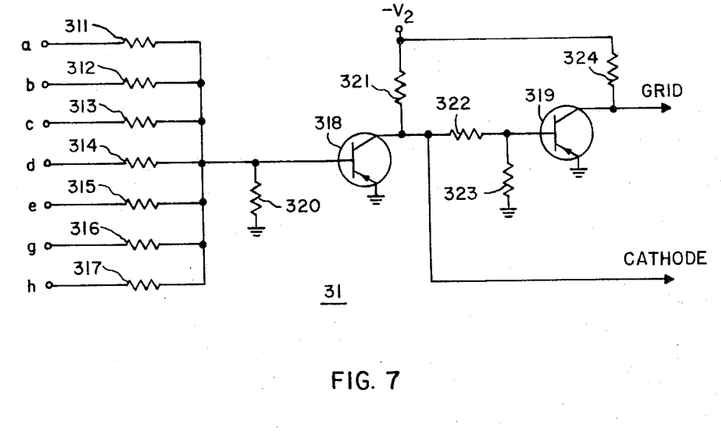
FIG. 7 is a detailed schematic diagram of the intensifier OR circuit and inverter.

FIG. 7 is a detailed circuit diagram of the intensifier OR circuit and inverter 31. The common output lines of the light-segment matrix 10 and the not-light matrix 29 corresponding to the segments of the pattern are connected through a plurality of resistors 311–317, inclusive, to a common point as shown in FIG. 7. This connection provides an OR type function. Following this connection is a two-stage amplifier including an inverter composed of transistors 318 and 319 and resistors 320–324 inclusive. The inverter operation provides an additional signal of opposite polarity so that both polarity signals are available to drive the grid or cathode, or both, of the cathode-ray tube 20. Thus, as the cathode-ray beam scans the face of the cathode-ray tube 20, the bias signals being applied to the cathode-ray tube are effective to maintain the tube above cutoff for the duration of the scans of those segments which go to make up the particular characters. Whenever a suppression signal is developed by the not-light matrix 29, the cathode-ray tube 20 is rendered nonconductive for the duration of the scan corresponding to that segment.

The foregoing description has set forth the manner in which a single character may be displayed by selecting appropriate segments of a single pattern and rejecting other segments of this single pattern. The character display apparatus constructed in accordance with the present invention is capable of simultaneously displaying a plurality of characters, each of these characters being developed from one of a plurality of patterns.

The horizontal deflection circuit 21, in addition to developing the horizontal deflection signal for scanning a figure eight pattern, additionally may step the pattern in a horizontal direction. That is, after a complete pattern has been scanned, another pattern is scanned at a different location. Thus, a row of figure eight patterns may be scanned. After the row is complete the horizontal deflection circuit returns the scan to the starting point and the vertical deflection circuit 23 steps the scan vertically so that another row of figure-eight patterns may be scanned. Two rows of eight patterns each may be developed by the character display apparatus shown in FIG. 2. Output signals from terminals $D_0$, $E_0$ and $F_0$ of flip-flops 15, 16 and 17, respectively, are applied to the horizontal deflection circuit as shown in FIG. 4a to step the pattern in the horizontal direction and the output signal from terminal $H_1$ of flip-flop 18, applied to the vertical deflection circuit, also shown in FIG. 4a, steps the pattern in the vertical direction after the row of horizontal patterns has been scanned. Again, the connections from flip-flops 15–18, inclusive, to the horizontal and vertical deflection circuits has been omitted from FIG. 2 for the sake of clarity. As shown in FIG. 4a, terminal $H_1$ is connected to output terminal 231 through resistors 247 and 248 and a transistor 249 having an emitter resistor 250. Terminals $D_0$, $E_0$ and $F_0$ are individually connected to output terminal 211 through resistors 217–222, inclusive, and transistors 223–225, inclusive, respectively having emitter resistors 226–228, inclusive.

Figure 8:
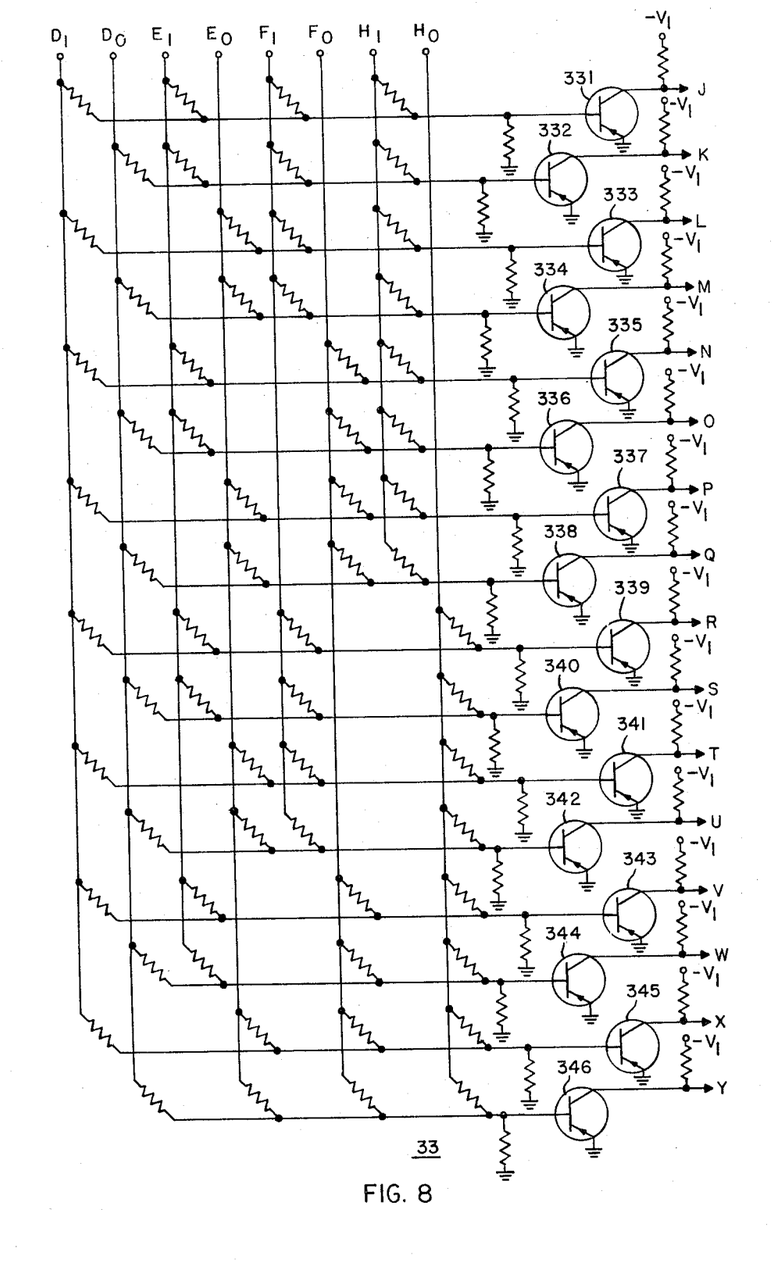
FIG. 8 is a detailed schematic diagram of the binary coded decimal selector matrix.

Referring to FIG. 2, flip-flops 15–18, inclusive, supply timing signals to a binary coded decimal selector matrix 33. The binary coded decimal selector matrix 33 times the selection of characters to be displayed according to the particular pattern being scanned at any particular time. Referring to FIG. 8, there is shown a detailed circuit diagram of the binary coded decimal selector matrix 33. The input terminals designated $D_0$–$H_1$, inclusive, correspond to the output terminals of flip-flops 15–18, inclusive; $D_0$ and $D_1$ being the output terminals of flip-flop 15, $E_0$ and $E_1$ being the output terminals of flip-flop 16, $F_0$ and $F_1$ being the output terminals of flip-flop 17, and $H_0$ and $H_1$ being the output terminals of flip-flop 18. As the figure eight pattern is scanned in the first location, flip-flops 12, 13 and 14 go through eight counts corresponding to the eight scans necessary to complete the entire figure eight pattern. On the ninth count, the scan of the figure eight pattern is again commenced, however, flip-flop 15 also changes its state corresponding to a displacement of one position in the horizontal direction. Thus, eight counts are necessary in order to change the state of that portion of the scaler timing chain composed of flip-flops 15–18, inclusive. Each transistor 331–346, inclusive, in the binary coded decimal selector matrix 33, along with its associated circuitry, operates on NOR type logic. At any one time only one of the transistors 331–346, inclusive, has a simultaneous absence of negative signals applied to its base. For example, for scanning in the first position, the base of transistor 331 is connected to input terminals $D_1$, $E_1$, $F_1$ and $H_1$ which may all be at zero potential. This transistor is the only transistor which has a simultaneous absence of negative signals applied to its base and therefore it generates an output signal.

Figure 9:
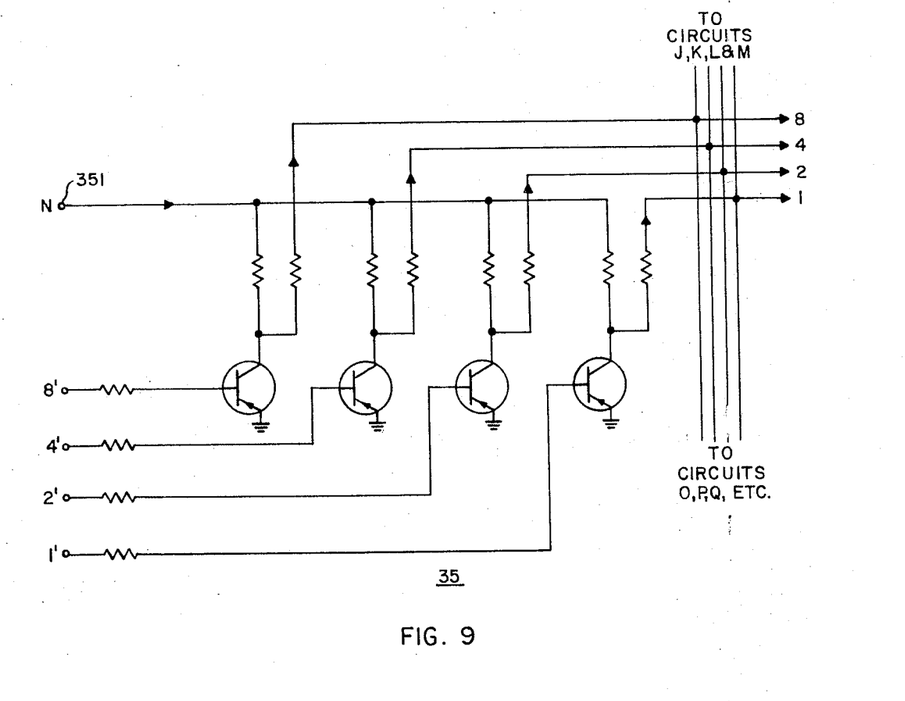
FIG. 9 is a detailed schematic diagram of a typical circuit in the input commutator.

The input commutator 35 shown in FIG. 2 receives the information from the binary coded decimal selector matrix 33 as to which position is being scanned and chooses the particular character representative signal which is to be displayed in the position being scanned. Sixteen character representative signals each having four binary bits may be supplied from the computer 26 to the input commutator 35. A portion of the input commutator 35 is shown in FIG. 9. Each input line J–Y, inclusive, has associated with it a circuit such as the one shown in FIG. 9. The character representative signals supplied by computer 26 are supplied to the input terminals designated 8', 4', 2' and 1' associated with each such circuit in the input commutator 35. When the input terminal 351 receives a signal from the binary coded decimal selector matrix 33 at the time that the character represented by the binary signals supplied to this circuit is to be displayed, the circuit supplies the character representative signal to the output lines designated 8, 4, 2 and 1 in both FIGS. 2 and 9. The character is thus displayed in the manner previously described.

While there has been described what is at present considered to be the preferred embodiment of this invention, it will be obvious to those skilled in the art that various changes and modifications, such as use of an image-reproducing device other than a cathode-ray tube, may be made therein without departing from the invention and it is, therefore, aimed to cover all such changes and modifications as fall within the true spirit and scope of the invention.

What is claimed is:
1. Character display apparatus comprising:
a cathode-ray tube capable of displaying characters composed of selected segments of a straight-line figure-eight pattern at a plurality of predetermined locations on said tube;
first means for supplying groups of signals, each group representative of a particular character to be displayed;
second means for generating a plurality of timing control signals;
third means coupled to said second means and responsive to said timing control signals for generating signals corresponding to the segments of said straight-line figure-eight pattern;
fourth means coupled to said second means and responsive to said timing control signals for developing signals usable for controlling scanning of said pattern and positioning of said scanned pattern at each of said predetermined locations in a first sequence;
deflection means coupled to said fourth means and responsive to said scanning control and positioning control signals for deflecting a cathode-ray beam within the tube;
fifth means coupled to said first and second means and responsive to said groups of representative signals and said timing control signals for developing resultant signals, corresponding to the particular char- acter represented by each of said groups, in a second sequence which determines the location at which the particular character represented by each of said groups is to be displayed;

and sixth means coupled to said third and fifth means and responsive to said generated signals and said resultant signals for coupling said generated signals corresponding to the segments of said pattern needed to make up each of said particular characters of said cathode-ray tube, to cause said tube to conduct to display the segments comprising each of said particular characters at its predetermined location and be rendered nonconductive for all other segments.

2. Character display apparatus comprising:

a cathode-ray tube capable of displaying characters composed of selected segments of a straight-line figure-eight pattern at a plurality of predetermined locations on said tube;

first means for supplying groups of signals, each group representative of a particular character to be displayed;

second means including a source of clock pulses and scalar timing chain, for generating a plurality of timing control signals;

third means coupled to said second means and responsive to said control signals, for generating signals corresponding to the segments of said straight-line figure-eight pattern;

fourth means coupled to said second means and responsive to said control signals for developing signals usable for controlling scanning of the pattern, and positioning of the scanned pattern in a first sequence at each of said predetermined locations where said particular characters are to be displayed;

deflection means coupled to said fourth means and responsive to said scanning control and positioning control signals, for deflecting a cathode-ray beam within the tube;

fifth means coupled to said first and said second means and responsive to said groups of representative signals and said timing control signals for scanning each of said groups of character representative signals in a second sequence and developing resultant signals which correspond to the signals of the group being scanned at that particular time, said scan being at such a rate that said third means generates signals corresponding to segments of a complete figure-eight pattern during each scan, wherein said second sequence determines the location at which the particular character represented by each of said groups is to be displayed;

and sixth means, coupled to said third and fifth means and responsive to said generated signals and said resultant signals for coupling said generated signals corresponding to the segments of said pattern needed to make up each of said particular characters to said cathode-ray tube, to cause said tube to conduct to display the segments comprising each of said particular characters at its predetermined location and be rendered nonconductive for all other segments.

3. Apparatus for generating signals corresponding to segments of a pattern from which selected segments form particular characters to be displayed at predetermined locations on an indicating device comprising:

first means for supplying groups of signals, each group representative of a particular character to be displayed;

second means for generating a plurality of timing control signals;

third means coupled to said second means and responsive to said timing control signals, for generating signals corresponding to the segments of said pattern;

fourth means coupled to said second means and responsive to said timing control signals for developing signals usable for scanning said pattern and positioning said scanned pattern at each of said predetermined locations in a first sequence;

fifth means coupled to said first and said second means and responsive to said groups of representative signals and said timing control signals for developing resultant signals, corresponding to the particular character represented by each of said groups, in a second sequence which determines the location at which the particular character represented by each of said groups is to be displayed;

and sixth means coupled to said third and fifth means and responsive to said generated signals and said resultant signals for supplying output signals representative of said generated signals corresponding to those segments of said pattern needed to make up each of said particular characters and to display each of said particular characters at its predetermined location.

4. Signal developing apparatus as described in claim 3, wherein said third means generates signals corresponding to segments of a straight-line figure-eight pattern.

5. Signal developing apparatus as described in claim 3, wherein said indicating device is a cathode-ray tube and said output signals are coupled to said tube.

6. Signal developing apparatus as described in claim 3, wherein said sixth means includes passive resistor matrix circuitry coupled to said second means.

7. Apparatus for generating signals for driving a cathode-ray tube, said signals being representative of selected segments of a straight-line figure-eight pattern which form particular characters to be displayed at predetermined locations on said tube comprising:

first means for supplying groups of signals, each group representative of a particular character to be displayed;

second means for generating a plurality of timing control signals;

third means coupled to said second means and responsive to said timing control signals, for generating signals corresponding to the segments of said straight-line figure-eight pattern;

fourth means coupled to said second means and responsive to said timing control signals for developing signals usable for controlling scanning of said pattern and positioning said scanned pattern in a first sequence at each of said predetermined locations where said particular characters are to be displayed;

deflection means coupled to said fourth means and responsive to said scanning control and positioning control signals for deflecting a cathode-ray beam within the tube;

fifth means coupled to said first and said second means and responsive to said groups of representative signals and said timing control signals for developing resultant signals, corresponding to the particular character represented by each of said groups, in a second sequence which determines the location at which the particular character represented by each of said groups is to be displayed;

and sixth means coupled to said third and said fifth means and responsive to said generated signals and said resultant signals for coupling said generated signals corresponding to the segments of said figure-eight pattern needed to make up each of said particular characters to said cathode-ray tube, to cause said tube to conduct to display the segments comprising each of said particular characters at its predetermined location and be rendered nonconductive for all other segments.

8. Apparatus for generating signals for driving a cathode-ray tube, said signals being representative of selected segments of a pattern which form particular characters to be displayed at predetermined locations on said tube comprising:

first means for supplying groups of signals, each group representative of a particular character to be displayed;

second means including a source of clock pulses and a scaler timing chain, for generating a plurality of timing control signals;

third means coupled to said second means and responsive to said timing control signals for generating signals corresponding to the segments of a straight-line figure-eight pattern;

fourth means coupled to said second means and responsive to said timing control signals for developing signals usable for controlling scanning of said pattern and positioning of said scanned pattern in a first sequence at each of said predetermined locations where said particular characters are to be displayed;

deflection means coupled to said fourth means and responsive to said scanning control and positioning control signals, for deflecting a cathode-ray beam within the tube through a complete segmented figure-eight pattern at each of the plurality of predetermined locations where said particular characters are to be displayed;

fifth means coupled to said first and said second means and responsive to said groups of representative signals and said timing control signals for scanning each of said groups of character representative signals in a second sequence and for developing resultant signals which correspond to the signals of the group being scanned at that particular time, said scan being at such a rate that said third means generates signals corresponding to segments of a complete figure-eight pattern during each scan, said second sequence being representative of and determining the location at which the particular character represented by each of said groups is to be displayed;

and sixth means coupled to said third and said fifth means and responsive to said generated signals and said resultant signals for coupling said generated signals corresponding to the segments of said pattern needed to make up each of said particular characters to said cathode-ray tube, to cause said tube to conduct to display the segments comprising each of said particular characters at its predetermined location and be rendered nonconductive for all other segments.

References Cited by the Examiner

UNITED STATES PATENTS

| | | | |
|---|---|---|---|
| 2,987,715 | 6/1961 | Jones et al. | 340—324.1 |
| 3,047,851 | 7/1962 | Palmiter | 340—324.1 |
| 3,090,041 | 5/1963 | Dell | 340—324.1 |
| 3,104,387 | 9/1963 | Loshin | 340—324.1 |
| 3,161,866 | 12/1964 | Orenstein et al. | 340—324.1 |
| 3,165,729 | 1/1965 | Richman | 340—324.1 |

NEIL C. READ, *Primary Examiner.*

A. J. KASPER, *Assistant Examiner.*